March 16, 1965 W. P. DYKE ETAL 3,174,043
SHORT PULSE-HIGH INTENSITY VACUUM ARC X-RAY SYSTEM
Filed June 1, 1961 3 Sheets-Sheet 1
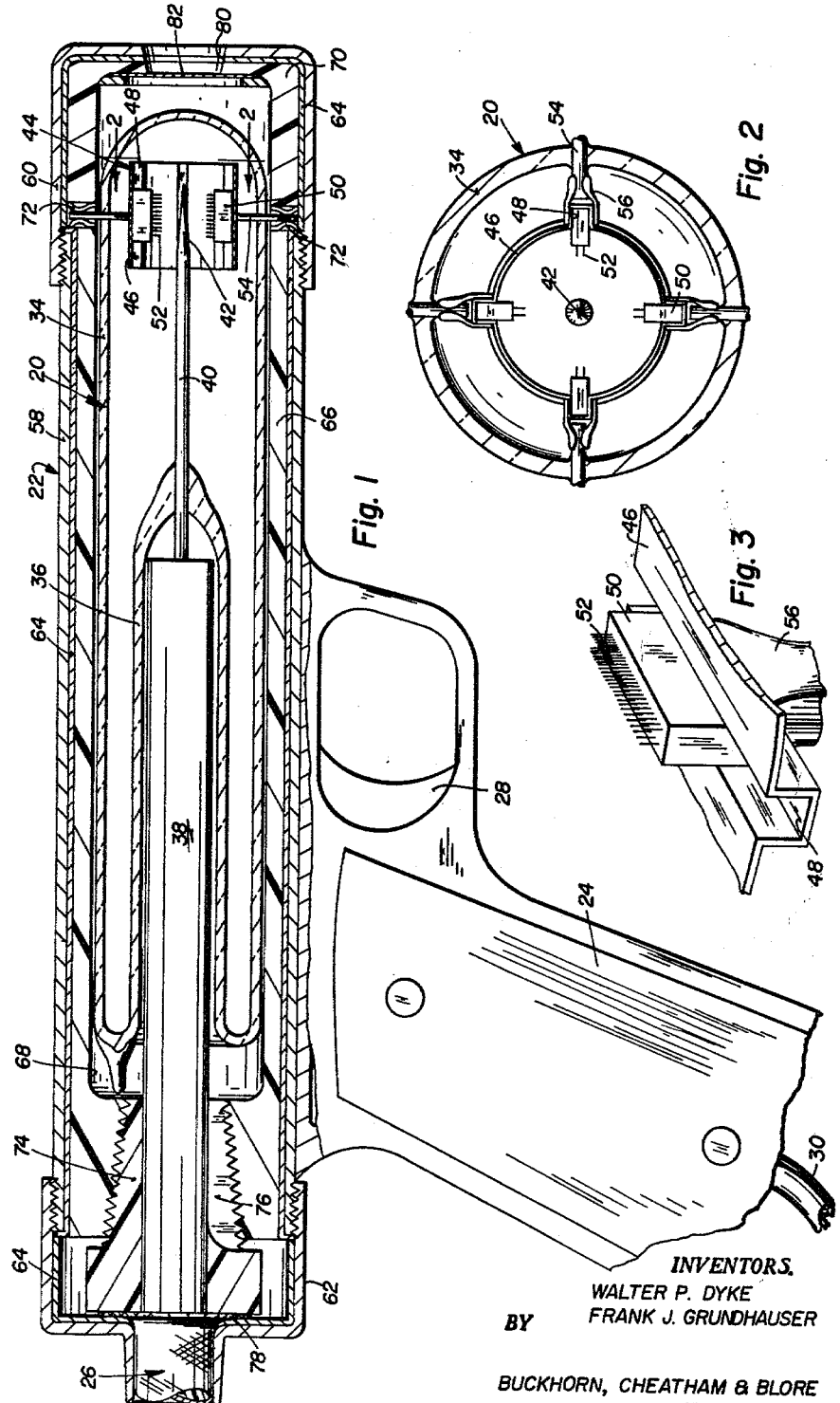
INVENTORS.
WALTER P. DYKE
BY FRANK J. GRUNDHAUSER
BUCKHORN, CHEATHAM & BLORE
ATTORNEYS

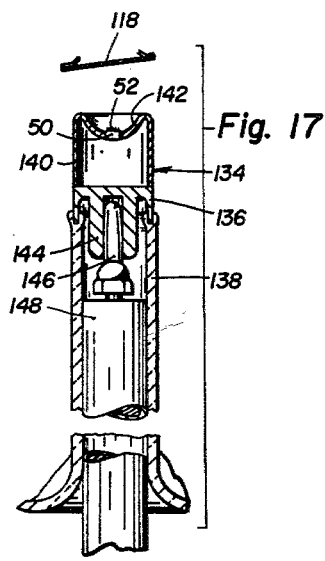
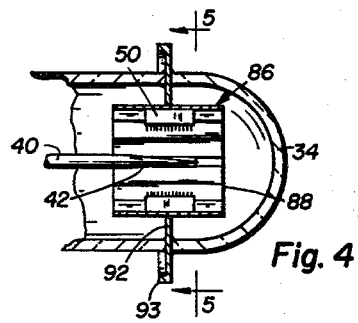
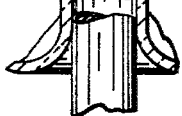
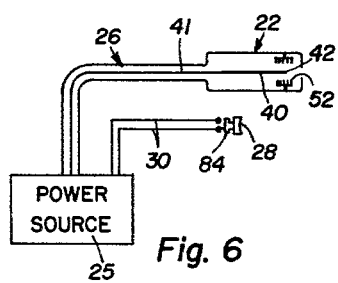
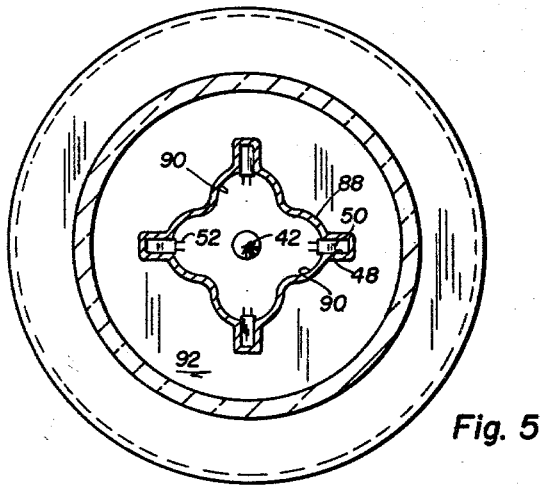
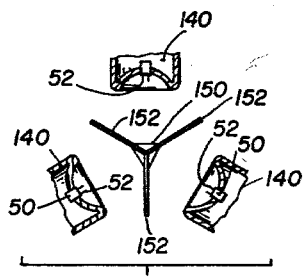
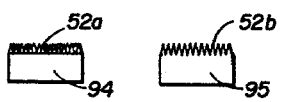

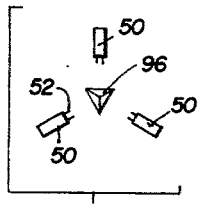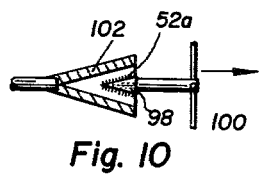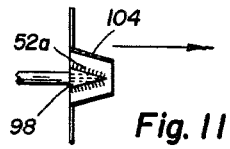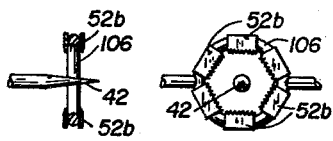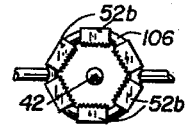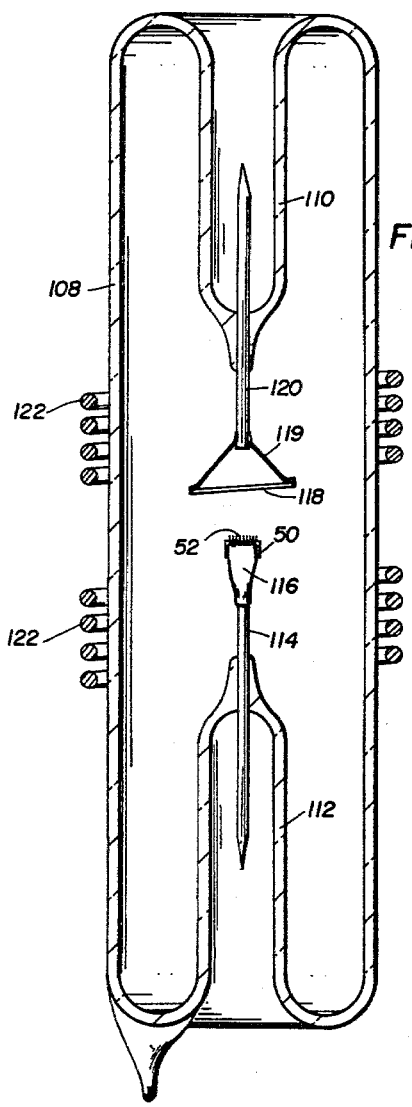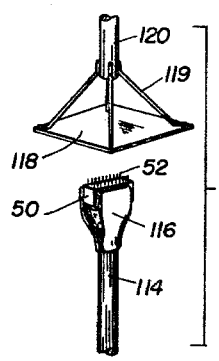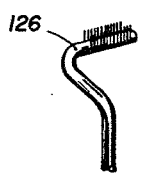

United States Patent Office 3,174,043
Patented Mar. 16, 1965

3,174,043
SHORT PULSE-HIGH INTENSITY VACUUM ARC
X-RAY SYSTEM
Walter P. Dyke and Frank J. Grundhauser, McMinnville, Oreg., assignors to Field Emission Corporation, McMinnville, Oreg., a corporation of Oregon
Filed June 1, 1961, Ser. No. 114,125
12 Claims. (Cl. 250—93)

This invention relates to a vacuum arc X-ray tube, system and method for producing X-rays, and more particularly to an X-ray tube and to a system and method employing such tube to generate short pulses of high intensity X-rays from a small emitting area. Each of such pulses is generated by a high intensity accurately controlled vacuum arc produced in the tube for a very short length of time by a high voltage, high current pulse between a cathode having a plurality of closely spaced sharp needle points, at least some of which are partially melted by such arc, and an anode having such X-ray emitting area.

Vacuum arc X-ray tubes have been suggested in which a supplemental or starting anode has been employed in addition to a main anode and cathode to initiate an arc and cause metallic ions to be formed after which a main arc is produced between the cathode and a main anode, as the result of which high velocity electrons strike the main anode and produce X-rays. In such tubes, the original ionization has been caused by a spark or arc across a short gap between the starting anode and the cathode. The current flowing across such gap has been limited by a high resistance in series with the starting anode but the initial ionization results in establishing an arc across a much longer gap between the cathode and the main anode. Such tubes have been found to be erratic in performance and have not been usable to produce accurately formed and timed pulses of X-rays of the high intensity and short duration accomplished in the present invention.

In accordance with the present invention, the only electrodes required in the tube are a cathode and an anode. The cathode has thereon a plurality of sharp needle points of electrical conducting material directed toward but spaced from the anode. A pulse of electrical energy from a high voltage source capable of supplying a high current for a short period of time is delivered to the tube so as to produce a high voltage across the gap between the cathode and anode. Electrons are initially emitted from the sharp points of the cathode by field emission. The points are preferably of a refractory metal and the power source is such that the field emission current from the points is sufficiently high to at least partly melt and vaporize one or more of the points. The electrons attain high velocity because of the high voltage across the gap and strike the atoms vaporized from the cathode to produce positive ions which neutralize the space charge due to the emitted electrons. Additional electrons are emitted and also travel with high velocity toward the anode to produce more ions so that the effect is cumulative. The rapidly traveling electrons strike the anode to produce X-rays. The power source is such that the pulse has a short rise time and a short fall time and the duration of such pulse is less than the transit time across the gap between the cathode and the anode of any electrode material, such as ions or atoms or groups thereof, from the cathode. This means that current flow due to movement of positive ions from the anode to the cathode does not take place and the electrode material of the anode is also not carried to the cathode.

The preferred power source is one containing a plurality of open ended artificial transmission lines which can be charged from a high voltage source of direct current while such lines are connected in parallel. The lines referred to are then connected so that their other ends are in series with the gap between the cathode and anode of the X-ray tube. The lines discharged in series produces a pulse of current across such gap. With the type of power source just described, an extremely high voltage substantially square wave pulse can be produced which has a short rise time and a short fall time and which persists for a very short interval of time so that voltage drops to zero or substantially zero before electrode material from the cathode traveling toward the anode reaches such anode.

The transmission lines of the type of power source just described may all have the same characteristic impedance and the pulse referred to above can be transmitted to the X-ray tube through a coaxial cable line having a characteristic impedance equal to the output characteristic impedance of the power source, which is the sum of the characteristic impedances of such lines. Furthermore, the X-ray tube can be constructed and shielded so that it forms a continuation of such coaxial cable, which continuation has a characteristic impedance of the same order as that of the coaxial cable. Also the construction and spacing of the anode and cathode of the X-ray tube can be such that the electrical resistance of the gap immediately after the vacuum arc is established is of the same order as the characteristic impedance referred to. All of these factors contribute to producing a substantially square wave pulse of current which is of short duration predetermined by the electrical lengths of the transmission lines of the power source. The current increases rapidly to a maximum when the pulse is applied and after such predetermined time rapidly drops to zero. A high intensity pulse of X-rays is thus produced for a short period of time with minimum damage to the electrodes of the tube.

It is therefore an object of the invention to provide an improved X-ray system in which a tube particularly adapted for vacuum arc operation is employed.

Another object of the invention is to provide an X-ray system in which a high intensity pulse of X-rays of short duration is generated and emitted from a small anode area of an X-ray tube whenever a high voltage, high current pulse of electrical energy is applied to the tube from a suitable power source, which tube is capable of repeated operation under accurately controlled conditions.

Another object of the invention is to provide an X-ray system by which a high intensity vacuum arc can be produced in an X-ray tube in which a cathode has a plurality of closely spaced metal needle points directed toward an anode and the arc results in at least partial melting and vaporization of the metal of one or more of such points.

Another object of the invention is to provide an improved X-ray system employing a vacuum arc tube in which the tube is energized from a high voltage, high current source of electrical energy producing a vacuum arc of shorter duration than the transit time of electrode material from the cathode across the gap between the cathode and anode of such tube.

A further object of the invention is to provide an X-ray system in which an X-ray tube of the vacuum arc type is employed and a pulse of electrical energy is delivered to such tube through a coaxial cable having substantially the same characteristic impedance as the source of electrical energy and in which the tube itself and its shielding forms a continuation of the coaxial conductor with a characteristic impedance of the same order as such coaxial conductor and in which the resistance of the arc formed in the gap between the cathode and anode is also of the same order as such characteristic impedance.

A still further object of the invention is to provide an improved method of producing X-rays in which a vacuum arc tube is employed and in which a high intensity pulse of X-rays is emitted from a small anode area for a very short interval of time.

Other objects and advantages of the invention will appear in the following detailed description of various embodiments shown in the attached drawings of which:

FIG. 1 is a side elevation of a portable X-ray gun in accordance with the present invention with the upper portion of the gun broken away to show internal structure in vertical section including an X-ray tube in accordance with the invention;

FIG. 2 is a vertical section through the tube of FIG. 1 on an enlarged scale and taken on the line 2—2 of FIG. 1;

FIG. 3 is a fragmentary isometric view on a still larger scale showing a detail of the cathode structure of the tube of FIGS. 1 and 2;

FIG. 4 is a fragmentary vertical section showing a modification of the tube of FIGS. 1 to 3;

FIG. 5 is a vertical cross section through the tube of FIG. 4 on an enlarged scale and taken on the line 5—5 of FIG. 4;

FIG. 6 is a simplified schematic diagram showing suitable connections between the tubes of FIGS. 1 to 5 and a power source;

FIG. 7 is a side elevation of a modified form of cathode member usable in X-ray tubes in accordance with the present invention;

FIG. 8 is a view similar to FIG. 7 of a further modified form of cathode member;

FIG. 9 is a fragmentary end elevation of a modification of a cathode and anode structure usable in the tubes of FIGS. 1 to 5;

FIG. 10 is a fragmentary side elevation, partly in section, of another modification of a cathode and anode structure;

FIG. 11 is a view similar to FIG. 8 of another modified cathode and anode structure;

FIG. 12 is a view similar to FIG. 8 showing another modified cathode and anode structure;

FIG. 13 is an end elevation of the cathode and anode structure of FIG. 12;

FIG. 14 is a vertical sectional view showing another modified X-ray tube in accordance with the present invention;

FIG. 15 is a fragmentary isometric view on an enlarged scale of the cathode and anode structure of the tube of FIG. 12;

FIG. 16 is a view similar to FIG. 13 of a modified form of cathode;

FIG. 17 is a fragmentary sectional view of a modified cathode structure usable in the tube shown in FIGS. 12 and 13; and FIG. 18 is a fragmentary partly sectional view of a modified anode-cathode structure including a plurality of cathodes and a single anode.

Referring more particularly to the drawings, the portable X-ray device shown in FIG. 1 includes an X-ray tube 20 of elongated tubular form mounted in a casing 22. The casing is provided with a pistol grip handle 24 and has an overall shape similar to that of a gun. Electric power for operating the X-ray tube 20 is supplied to the device of FIG. 1 from a power source 25 through a coaxial cable 26, as indicated in FIG. 6. A control circuit closed by actuation of a trigger 28 mounted in the handle 24 of the gun is provided by a separate control cable 30 extending from the handle of the gun to the power supply 25.

The tube 20 includes an elongated tubular glass envelope 34 having a reentrant tubular portion 36 extending from one end thereof for receiving an end 38 of the coaxial cable 26 from which the outer insulation cover and also the conducting braid forming the outer conductor of the cable has been removed. The reentrant portion 36 provides a support for an anode member 40 which extends through and is sealed in the inner end of the reentrant portion 36. The anode member 40 makes contact with the inner conductor 41 of the coaxial cable 26 as indicated in FIG. 6. The anode member 40 terminates near the end of the tube remote from the reentrant portion 36 in a conical or pointed anode target portion 42 which forms the anode proper.

In the embodiment of FIG. 1, the anode portion 42 is surrounded by a cathode structure 44 including an open ended cylindrical shielding and focusing sheet metal member 46 formed to provide a plurality of circumferentially spaced, radially extending slots 48 in its inner surface. A small cathode member 50 having a large number of closely spaced sharp needle points 52 directed radially inwardly toward the anode portion 42 is secured in each slot 48. The points 52 are spaced from the anode portion 42 a distance determined by the desired operation of the tube as discussed below. The cylindrical member 46 is preferably of greater axial length than the active portions of the cathode defined by the points 52 and of greater axial length than the active portion 42. The cylindrical member 46 is supported in the envelope 34 by a plurality of radially outwardly directed pins 54 extending outwardly through and sealed in the envelope 34 and attached to the cylindrical member 46 by clips 56.

The casing 22 includes an outer tubular casing member 58, a front end cap 60 and a rear end cap 62. Such end caps are screw-threaded upon the ends of the casing member 58 and both the casing member and the end caps are lined with a layer 64 of lead for X-ray shielding. The casing member 58 and end caps 60 and 62 may be of metal in which case they act as a grounded outer electrical conductor. Such casing and end caps may, however, be of insulating material such as a molded plastic, in which case the layer 64 of lead can act as an outer electrical conductor as well as an X-ray shield.

The interior of the casing 22 contains a tubular member 66 of insulating material providing a socket 68 for the reception of the envelope 34 of the tube 20. The front end cap 60 also contains a cap-shaped member 70 of insulating material and the tube 20 is held securely in the socket 68 by spring washers 72 engaging the pins 54 and compressed between the insulating members 66 and 70 when the cap 60 is screwed upon the casing member 58. Such spring washers are of electrical conducting material and make contact with the lead lining 64 to provide a grounded electrical return connected for the cathode structure 44.

The end 38 of the coaxial cable 26 may be held securely in position in the tubular insulating member 66 by a plug 74 of insulating material which has a screw-threaded conical portion slotted as indicated at 76. The plug 74 is screw-threaded into a correspondingly screw-threaded conical socket in the rear portion of the insulating member 66 so as to grip the end 38 of the coaxial cable. This holds such cable securely in position in the reentrant portion 36 of the tube 20. The braid 78 of conducting material forming the outer conductor of the coaxial cable 26 has its end spread as indicated at 78 and is compressed between the lead layer 64 of the rear cap 62 and the head of the plug 74 when the cap 62 is screw-threaded upon the casing member 58. It will be apparent that the lead layer 64 or the casing 22, if of conducting material, constitutes a continuation of the outer conductor of the coaxial cable so as to provide a continuation of the coaxial structure of such cable. The anode and cathode structure described above likewise provides a continuation of such coaxial structure and the characteristic impedance of such continued coaxial structure will be of the same order as that of the coaxial cable 26.

The front end cap 60 of the casing 22 has an aperture 80 in axial alignment with the anode-cathode structures of the tube at least through the lead layer 64 and preferably through the material of the cap itself, if of metal. In the latter case the aperture 80 is preferably closed with a thin layer 82 of a material substantially transparent to X-rays, such as plastic or certain metals known to the art.

The trigger 28 may close a switch 84, indicated diagrammatically in FIG. 6, to cause the power source 25 to deliver a pulse of electrical energy through the coaxial cable 26 to the tube 20 so that a high voltage, high current pulse is produced between at least some of the points 52 of the cathode structure and the anode 40. The power source 25 may be of the general type of pulser shown in the copending application of Walter P. Dyke et al., Serial No. 103,796, filed April 18, 1961. Such power source for portable X-ray devices such as shown in FIGS. 1 to 3 may be of smaller power output and of smaller size and of more compact construction so as to enable it to be contained in a carrying case. The general type of tube shown in FIGS. 1 to 3, can, however, be made of larger size for higher power stationary installations, in which case larger size power sources are employed.

As a specific example, a tube of the type shown in FIGS. 1 to 3 and usable in a portable X-ray apparatus may have a cathode structure with four cathode members 50, each providing a comb of one hundred needle points. Such needle points may be of tungsten wire having a diameter of 2 mils and may protrude from the members 50 a distance of 30 mils. Such wires may have extremely sharp points providing a hemispherical tip of a radius of the order of $10^{-5}$, $10^{-3}$ cms. Such points may, for example, be spaced 5 mils on centers. Several manners of producing cathode members having a plurality of sharp points thereon are described later in this specification. The anode 40 also may have its conical or pointed portion 42 made of tungsten and such anode may, for example, be 1 mm. in overall diameter and have a 7° taper with respect to the axis of the anode. A suitable anode spacing between the ends of the points 52 and the surface of the conical portion of the anode 42 for a tube employed in a portable X-ray is approximately 100 mils. With an anode and cathode structure such as above described, the high voltage power supply may, for example, be capable of providing a 1400 ampere pulse delivered through a 70 ohm coaxial cable and lasting for approximately .03 microsecond. The resistance across the gap after the arc is formed is approximately 70 ohms and the voltage across the gap approaches 100,000 volts. An extremely high intensity electric field is initially produced adjacent the points of the cathode elements so that electrons are emitted and travel toward the anode at high velocity.

The discharge takes place between a relatively few of the points, usually two or three, and the anode but since the anode is of small diameter, the X-ray emitting area of the anode is small in all cases and occupies very nearly the same position during repeated operations of the tube. The current through the points from which the discharge take place is sufficient to partly melt the points from which the arc discharge takes place and also to vaporize a small part of the tungsten so that metallic atoms are bombarded by electrons and positive metallic ions are produced. The resultant arc shields adjacent points from the field between the anode and cathode so that the discharge tends to remain localized from two or three spaced points. The next time the tube is fired the discharge will ordinarily take place between other points and the anode since the partial melting of the points in the original discharge tends to shorten them. Because of the large number of points which may be several hundred or thousands, the tube remains operative with no loss of efficiency for a large number of operations, for example, several thousand.

The voltage and current pulse is of much shorter time than the transit time of any electrode material from the cathode across the gap between the cathode and the anode. Such electrode material contains particles such as ions or atoms or groups thereof, which are of much greater mass than electrons. The high velocity electrons striking the anode cause metal to be removed therefrom but positive ions thus produced are not carried back to the cathode because of a short duration of the voltage and current pulse. Even if some of the metal from the anode does reach the cathode, the anode is preferably made of the same metal as the cathode points so that cathode contamination does not occur. Also for the same reason no contamination of the anode occurs by reason of any metal which may reach the anode from the cathode.

An extremely high intensity pulse of X-rays is produced and because of the conical nature of the anode, a substantial portion of the X-rays thus produced are emitted outwardly through the aperture 82 in the forward cap member 60. This pulse of X-rays under the conditions above described is sufficient to penetrate one-inch of aluminum at one foot and give excellent contrast on the photographic plate. Since the pulse length is approximately 0.3 microsecond, it is apparent that even extremely high velocity of motion of the subject being X-rayed can be stopped, although the device is also entirely applicable to stationary objects. The resolution is such that small components of approximately 2 mils diameter are clearly shown.

The tube and system of the present invention is not limited to the size just discussed but may be made in substantially any size within wide limits operating with higher or lower voltages and with current pulses of the same or different length. Thus it is possible to provide tubes having a relative few cathode needle points, for example, one hundred points on a single cathode member up to tubes having a large number of cathode members providing groups of needle points each having thousands of cathode needle points. Also the spacing of the needle points on the cathode members can be varied as well as the spacing of the points from the anode. It is the intensity of the field adjacent the needle points which controls the speed of arc formation and the current level attained. The higher the field the higher the current and the higher the speed of arc formation. The field can be increased by increasing the relative spacing of the needles in the needle groups, by decreasing the spacing to the anode and decreasing the radius of curvature of the point as well as by increasing the voltage of the power source. The spacing of the needle points in a group of needles can for example vary from approximately 1 to 30 mils, the usual spacing being 5 to 10 mils, and the radius of curvature of the points is preferably of the order of $10^{-5}$ to $10^{-3}$ cm. The spacing of the points from the anode may, for example, vary from 50 mils to several hundred mils, the longer spacings being employed for longer pulse lengths since the distance should be such that the transit time of electrode material from the cathode to the anode is greater than the pulse length. Such pulse lengths can vary, for example, from 1/100 microsecond up to ½ microsecond for tubes of the type shown in FIGS. 1 to 3.

A modified form of cathode structure 86 is shown in FIGS. 4 and 5. Such cathode structure is suitable for employment in a tube of the general type shown in FIGS. 1 to 3 and includes an axially extending hollow cylindrical member 88 surrounding an anode portion 42 of the same type shown in the tube of FIG. 1. The member 88 has a plurality of inwardly concave focusing portions 90 formed therein of approximately semicircular conformation. Each concave portion 90 has a slot 48 in its trough portion which contains a small cathode member 50 having a plurality of cathode points 52 directed toward the anode portion 42. The concave portions 90 provide focusing cups for the stream of electrons which travel between certain of the points 52 and the anode portion 42. The member 88 is positioned in a suitably shaped aperture in a metallic disc 92 which may be of a suitable or known alloy having a thermal coefficient of expansion similar to that of the glass of the envelope 34 of the tube and such disc 92 may extend continuously through such envelope. That is to say, the portions of the envelope on opposite sides of the disc 92 are sealed to such disc. The outer peripheral portion of the disc 92 preferably has a stiffening flange 93 thereon to prevent warping.

The cathode structure of FIGS. 4 and 5 is shown as having a somewhat greater spacing between the cathode points 52 and anode portion 42 than is the case of the anode-cathode structure shown in FIGS. 1 to 3, so that the tube of FIGS. 4 and 5 is adapted for somewhat higher voltage operation and longer pulse lengths, i.e., up to several microseconds. The concave trough portions 90 of the member 88 of FIGS. 4 and 5 provide a better focusing effect than the circular member 46 of FIGS. 1 and 2, which, however, does have a substantial focusing effect so that the X-ray emitting areas struck by electrons traveling from the cathode are small in both structure.

The cathode member 50 or similar cathode members can be fabricated in a variety of ways. One way of making a cathode member 50 is to wind fine tungsten wire on a screw-threaded mandrel of copper, then copper plate the assemblage, again screw thread the exterior, wind another layer of fine tungsten wire, and again plate with copper, etc., until the desired number of rows of wire have been produced. In most of the figures two rows have been shown and the spacing of the rows of points and the individual points has been exaggerated, but substantially any desired number of rows of points can be employed. The wire wound and plated mandrel described above can then be cut into small sections to provide small copper blocks through which one or more layers of closely spaced parallel fine tungsten wires extend. A portion of the copper can be etched away by known or suitable solutions to expose the ends of such wires and such ends can then be sharpened by known or suitable etching solutions to provide the cathode members 50.

Another type of cathode member 94 is shown in FIG. 7 as having a plurality of sharp points 52a thereon formed by dendridic crystal growth, for example, by the thermal decomposition of vaporized tungsten hexacarbonyl or tungsten hexachloride in contact with the surface of a tungsten element at elevated temperatures above those which form smooth coatings.

A further type of cathode member 95 is shown in FIG. 8 as having a plurality of small sharp points 52b thereon formed by photoetching. Such points may be formed along the edge of a thin tungsten strip by photographically producing a resist or protective coating in the form of fine points on a strip of the metal and etching away the uncoated portions. The thin strips with points thereon can then be attached to a base or block or be laminated into such a block to form a cathode member 95.

Various forms of cathode-anode structures suitable for employment in modified tubes of the general type shown in FIGS. 1 to 5 are shown in FIGS. 9 to 12, inclusive. In FIG. 9 a pointed anode 96 of triangular pyramidal form is shown surrounded by three cathode members 50 of the same general type as shown in FIGS. 1 to 5. Such cathode members 50 has a plurality of cathode points 52 thereon and may be supported in any desired manner, for example, in the manner shown in either FIGS. 1 to 3, or FIGS. 4 and 5. Each of the anode areas struck by electrons is thus a flat surface. It is apparent that more than three such flat surfaces and a corresponding number of cathode members may be employed. It is also apparent that the cathode members may be of the type described with reference to FIGS. 7 and 8.

As shown in FIG. 10, a cathode member 98 may be the conical or pointed member and such member may be supported in any suitable manner such as by a spider 100 within a hollow, conical anode 102. The cathode member 98 has a plurality of cathode points 52a thereon which may, for example, be of the type described with reference to FIG. 7, and the utilized X-rays may be propagated in the direction of the arrow shown in FIG. 8. In FIG. 10 the anode 102 may be of sufficient thickness to be relatively opaque to the X-rays generated on the inner surface thereof.

In FIG. 11 a structure similar to that of FIG. 10 is shown in which a hollow conical anode 104 is sufficiently thin that X-rays produced by impingement of electrons upon the inner surface of the anode are transmitted through the thin anode 104 and the X-rays utilized are those propagated in the direction of the arrow shown in FIG. 11. The cathode element may be of the same type as the cathode member 98 of FIG. 10 and have a plurality of cathode points 52a thereon.

Another anode-cathode structure usable in tubes of the general type shown in FIGS. 1 to 5 is shown in FIGS. 12 and 13, and includes an anode having a conical pointed anode portion 42 which may be the same as the anode portion 42 of FIGS. 1 to 5. The cathode structure may include a ring 106 of metal having a plurality of groups of cathode points 52b secured to its end surface and directed radially inwardly toward the anode portion 42. Such groups of cathode points may be formed, for example, as described with reference to FIG. 8.

The X-ray tube modification shown in FIGS. 14 and 15 has an envelope 108 of elongated tubular form with a pair of reentrant portions 110 and 112, one of which extends inwardly from each end of the tube. A cathode support 114 is shown as being held in a press at the inner end of the reentrant portion 112 and as having a cathode member 50 which may be of the same type as one of the cathode members 50 of the tube shown in FIGS. 1 to 3, supported thereon by a clip 116. The tube also contains an anode 118 in the form of a plate mounted upon an anode support 120 extending through a press in the other reentrant portion 110. The anode plate 118 is supported by elements 119 and may be of any suitable metal, such as tungsten. The plate 118 is inclined a few degrees, for example 7°, to a radial plane through the tube so that the area which is subjected to electron bombardment on the anode plate 118 is exposed laterally of the tube. The cathode member 50 is provided with a plurality of cathode points 52 and a suitable high voltage, high current pulse of electrical energy may be delivered to the anode and cathode by suitable conductors, for example, coaxial cables making contact with the anode and cathode supports 120 and 114, respectively, in a manner similar to that described with respect to the anode of the tube of FIG. 1.

The formation of the arc and general operation of the tube of FIGS. 14 and 15 is entirely similar to that of the tube of FIGS. 1 to 5 and the other forms of cathode members shown in FIGS. 7 and 8 can be employed instead of the cathode member 50. The tube of FIG. 14 can, for example, be of any desired size between wide limits for employment in stationary or portable X-ray equipment. No provision for focusing the electrons from the cathode upon the anode plate 48 is contained in the tube of FIGS. 14 and 15 but magnetic focusing such as by a magnetic field produced by current flowing in a coil indicated diagrammatically at 122 as surrounding the tube may be employed to focus the electrons from the cathode upon a small area of the anode.

The cathode shown in FIG. 16 is also suitable for employment in the tube of FIG. 12 and such cathode can be made, for example, by first winding fine tungsten wire around a pair of spaced parallel supports, one of which may be the cathode support 126 shown in FIG. 16. The resulting grid of wires may then be secured to the two supports by any suitable means, such as by electroplating a coating thereover or by spot welding, and the wires can then be severed between the supports and then pointed, for example, by etching procedures.

A modified type of cathode structure particularly suitable for tubes of the type shown in FIG. 14 is shown in FIG. 17. Such cathode structure includes a metallic sealing cup 136 of a suitable metal alloy having a thermal coefficient of expansion similar to that of the glass of the reentrant portion 138 of the tube envelope. Such cup has its outer peripheral flange sealed to the end of such reentrant portion. The cup 136 has secured thereto in any suitable manner a focusing member 140 of a suitable metal, such as copper, with its upper end formed into a concave focusing cup 142. A cathode member, such as the cathode member 50 of FIGS. 1 to 5, is supported in the lower portion of such cup with the points 52 thereof directed upwardly toward a suitable anode, such as the plate 118 of FIG. 12, supported in spaced relation to the cathode member 50.

The sealing cup 136 is provided with an interior boss or projection 144 having a suitable axially extending recess therein for the reception of a connector such as a conventional banana plug 146. Such banana plug may be secured to the interior conductor of an end of a suitable coaxial cable, a portion 148 of which is shown in FIG. 17. It will be apparent that the anode plate 118 of FIG. 17 can be supported in a similar manner upon a sealing cup similar to the cup 136. The focusing cup portion of the member 142 focuses the electron from the cathode points 52 upon a small area of the anode plate 112 so that X-rays are emitted from such small area.

The further modified anode-cathode structure shown in FIG. 18 includes three separate cathode cups 140 all of which may be identical and similar to the cups 140 of FIG. 17. Thus such cups may have mounted therein a cathode member 50 provided with cathode needle points 52 thereon. The cathode cups 140 are uniformly spaced around a common anode structure 150 having three identical flat surfaces forming a pointed triangular anode of pyramidal form. The cathode cups 140 and the cathode points 52 carried thereby are each directed toward one of such surfaces and such surfaces are separated by metallic barriers 152 so as to prevent electrons from the points 52 of a cathode member 50 from striking more than one flat anode surface.

The cathode cups 140 of FIG. 18 may be each individually supported for example in the manner shown in FIG. 17 in separate reentrant portions in a tube envelope so as to be connectable to separate power sources. Such power sources can be successively operated to produce successive pulses of X-rays from the various flat surfaces of the anode 150 so that successive X-ray exposures can be produced in rapid succession.

All of the embodiments of the tube of the present invention are constructed for operation in a manner carrying out the method of the present invention. The plurality of sharply pointed cathode needle points arranged in one or more groups and directed toward an anode surface provide for repeated production of pulses or bursts of X-rays at high intensity and for very short periods of time. Such pulses are produced by supplying high voltage, high current and very short pulses of electrical energy to the cathodes and anodes of the tubes through suitable transmission lines, such as coaxial cables. The pulses of electrical energy are of sufficient intensity to at least partly melt and vaporize one or more of the points so as to form a vacuum arc.

Electrons are initially emitted from the cathode points by field emission so that no auxiliary starting anode is required but the resultant electron current provided by the arc is many times greater than that afforded by field emission alone and may range, for example, with different size tubes from 1,000 to 100,000 amperes. The electrons constituting such current can be easily focused on a restricted area of the anode. As stated above, the pulses of electrical energy have a length or duration which is substantially less than the transit time of electrode material from the cathode points across the gap between the cathode points and the anode so that damage to such electrodes is minimized. The length of such pulses from a power supply containing a plurality of similar charged open ended transmission lines having their other ends connected in series and connected to the tube through a coaxial cable having a characteristic impedance equal the sum of the characteristic impedances of such lines is set by the electrical length of such lines and is equal to twice the time required for a voltage wave to travel the length of each of such lines. The voltage impressed across the gap between the cathode points and the anode is approximately one-half the sum of the voltages to which the individual lines are charged in parallel and the current delivered by the power supply and flowing across such gap is approximately equal to such voltage divided by the characteristic impedance of the coaxial cable. It has been found that tubes and the method and system described above are capable of reliable and repeated operation under accurately controlled conditions to produce intense pulses of X-rays from small anode areas approaching point sources.

It is to be understood that the invention is not to be limited to the embodiments described above but that the details may be varied.

We claim:
1. An X-ray system comprising:
an X-ray tube having an evacuated envelope having a portion transparent to X-rays,
an anode supported in said envelope, and having a surface exposed through said portion,
a cathode supported in said envelope adjacent said anode, said cathode having a plurality of spaced elements of electrically conducting material each having a sharp portion with a radius of curvature between $10^{-5}$ and $10^{-3}$ centimeters directed toward and spaced from said surface of said anode,
electrical connections for said anode and cathode extending to the exterior of said envelope,
and means for producing a high voltage, high current pulse of electrical energy between said anode and said cathode and of an intensity at least partly melting said sharp portion of at least one of said elements and forming a vacuum arc between said sharp portion and said anode.

2. An X-ray system comprising:
an X-ray tube having an evacuated envelope having a portion transparent to X-rays,
an anode supported in said envelope and having a surface exposed throughout said portion,
a cathode supported in said envelope adjacent said anode, said cathode having a plurality of closely spaced sharp metallic needle points directed toward and spaced from said surface of said anode,
electrical connections for said anode and cathode extending to the exterior of said envelope,
and means for producing a high voltage, high current pulse of electrical energy between said anode and said cathode of an intensity at least partly melting certain said needle points and forming a vacuum arc.

3. An X-ray system comprising:
an X-ray tube having an evacuated envelope having a portion transparent to X-rays,
a pointed anode supported in said envelope having its point directed toward said portion and a surface adjacent said point exposed through said portion,
a cathode supported in said envelope and surrounding said pointed electrode and spaced therefrom radially of the axis of said pointed electrode,
said cathode having a plurality of spaced sharp metallic elements carried thereby, each having a sharp portion with a radius of curvature between $10^{-5}$ and $10^{-3}$ centimeters directed toward and spaced from said surface of said anode,
electrical connections for said anode and cathode extending to the exterior of said envelope,
and means for producing a high voltage, high current pulse of electrical energy between said anode and said cathode and of an intensity at least partly melting said sharp portion and forming a vacuum arc between said sharp portion and said anode.

4. An X-ray system comprising:
an X-ray tube having an evacuated envelope having a portion transparent to X-rays,
a pointed anode supported in said envelope having its point directed toward said portion and a surface adjacent said point exposed through said portion, a cathode structure supported in said envelope and having a cathode portion spaced from said pointed anode radially of the axis of said anode, said cathode portion having a plurality of sharp needle points of electrically conducting material directed toward and spaced from said surface of said anode, electrical connections for said anode and said cathode portions extending to the exterior of said envelope, and means for producing a high voltage, high current pulse of electrical energy between said anode and said cathode of an intensity of least partly melting certain of said needle points and forming a vacuum arc.

5. An X-ray system comprising:

an X-ray tube having an evacuated envelope having a portion transparent to X-rays, a pointed anode supported in said envelope having its point directed toward said portion and a surface adjacent said point exposed through said portion, a cathode structure supported in said envelope and having a plurality of cathode portions circumferentially disposed around said pointed anode and spaced therefrom radially of the axis of said anode, each of said cathode portions having a plurality of closely spaced sharp metallic needle points directed toward and spaced from said surface of said anode, electrical connections for said anode and said cathode portions extending to the exterior of said envelope, and means for producing a high voltage, high current pulse of electrical energy between said anode and said cathode of an intensity at least partly melting certain of said needle points and forming a vacuum arc.

6. A vacuum arc X-ray system comprising:

an X-ray tube having an evacuated envelope having a portion transparent to X-rays, an anode supported in said envelope and having a portion exposed through said portion, a cathode structure supported in said envelope adjacent said cathode and having a plurality of closely spaced sharp needle points of electrically conducting material directed toward and spaced from said surface of said anode, electrical connections extending from said anode and said cathode structure to the exterior of said envelope, and means for producing a high voltage, high current pulse of electrical energy to be impressed between said anode and said cathode structure to produce a stream of electrons and a vacuum arc between said points and said anode, said cathode structure having a concave portion directed toward said surface of said anode and said points being supported within said concave portion to provide for focusing said stream of electrons on said surface of said anode.

7. An X-ray system comprising:

an X-ray tube having an evacuated envelope having a portion transparent to X-rays, a pointed anode supported in said envelope having its point directed toward said portion and a surface adjacent said point exposed through said portion, a cathode supported in said envelope adjacent said pointed anode and spaced therefrom radially of the axis of said pointed electrode, said cathode having a plurality of closely spaced sharp needle points of electrically conducting material directed toward and spaced from said surface of said anode, electrical connections for said anode and cathode extending to the exterior of said envelope, and means for producing a high voltage direct current pulse between said cathode and anode of an intensity at least partly melting certain of said points and forming a vacuum arc and of a duration shorter than the transit time to said anode of electrode material from said points.

8. An X-ray system comprising:

an X-ray tube having an elongated evacuated envelope having a portion transparent to X-rays, an anode electrode supported in said envelope adjacent the axis of said tube and having a surface exposed through said portion, a cathode electrode supported in said envelope adjacent said anode and coaxial with said anode electrode, said cathode electrode having a plurality of elements of electrically conducting material each having a sharp portion with a radius of curvature between $10^{-5}$ and $10^{-3}$ centimeters directed toward and spaced from said surface of said anode to provide an arc gap, a first electrical connection for one of said electrodes extending axially of said envelope to the exterior of said envelope adjacent one end of said envelope, a second electrical connection for the other of said electrodes extending to the exterior of said envelope adjacent the other end of said envelope, means for delivering a high voltage, high current pulse of electrical energy to said arc gap to form a vacuum arc including a coaxial cable having an inner conductor connected to said first electrical connection and an outer conductor, and a shield of conducting material surrounding said envelope and forming a continuation of said outer conductor, said shield being connected to said second electrical connection and forming with said first electrical connection a coaxial structure having a characteristic impedance of the same order as that of said coaxial cable.

9. An X-ray system comprising:

an X-ray tube having an elongated evacuated envelope having a portion transparent to X-rays in one end thereof, a pointed anode supported in said envelope adjacent the axis of said tube and having its point directed toward said portion and a surface adjacent said point exposed through said portion, a cathode supported in said envelope adjacent and surrounding said pointed anode and having a plurality of closely spaced sharp needle points directed toward and spaced from said surface of said anode to provide an arc gap, a first electrical connection for said anode extending axially of said envelope to the exterior of said envelope adjacent one end of said envelope, a second electrical connection for said cathode extending to the exterior of said envelope adjacent the other end of said envelope, means for delivering a high voltage, high current pulse of electrical energy to said arc gap to form a vacuum arc including a coaxial cable having an inner conductor connected to said first electrical connection and an outer conductor, a shield of conducting material surrounding said envelope and forming a continuation of said outer conductor, said shield being connected to said second electrical connection and forming with said first electrical connection a coaxial device having a characteristic impedance of the same order as that of said coaxial cable, and means including a handle in the shape of a pistol grip attached to said shield for moving said X-ray tube and a trigger switch mounted in said handle for causing said electrical pulse to be transmitted to said tube to emit a pulse of X-rays from said anode.

10. An X-ray pulse generator, comprising:

an evacuated envelope;

an anode supported in said envelope;

field emission cathode means supported within said envelope for bombarding said anode with electrons to produce X-rays, said cathode means including a plurality of spaced cathode elements of metal each having a sharp portion with a small radius of curvature to enable the field emission of electrons from said sharp portion;

means for supporting the cathode elements so that the sharp portions of said elements are spaced substantially the same distance from said anode; and means for applying a narrow, short rise time electrical pulse of high voltage and high current between said anode and said cathode elements to cause said field emission by at least one of said elements and to cause a vacuum arc to be produced between said one element and said anode to generate a short X-ray pulse of high intensity.

11. An X-ray pulse generator, comprising:

an evacuated envelope;

an anode having a pointed target portion supported in said envelope;

field emission cathode means supported within said envelope for bombarding said target portion with electrons to produce X-rays, said cathode means including a plurality of spaced cathode elements of metal each having a sharp portion with a small radius of curvature to enable the field emission of electrons from said sharp portion;

means for supporting the cathode elements so that the sharp portions of said elements are spaced substantially the same distance from said anode; and means for applying a narrow, short rise time electrical pulse of high voltage and high current between said anode and said cathode elements to cause said field emission by at least one of said elements and to at least partly vaporize the sharp portion of at least said one element to emit metal ions therefrom which cause a vacuum arc to be produced between said one element and said anode to generate a short X-ray pulse of high intensity.

12. An X-ray pulse generator, comprising:

an evacuated envelope;

an anode having a conical target portion supported in said envelope;

field emission cathode means supported within said envelope for bombarding said target portion with electrons to produce X-rays, said cathode means including a plurality of spaced cathode elements of metal each having a sharp portion with a small radius of curvature to enable the field emission of electrons from said sharp portion;

means for supporting the cathode elements so that the sharp portions of said elements are spaced substantially the same distance from said anode;

means for applying a narrow, short rise time electrical pulse of high voltage and high current between said anode and said cathode elements to cause said field emission by at least one of said elements and to at least partly vaporize the sharp portion of at least one element to emit metal ions therefrom which cause a vacuum arc to be produced between said one element and said anode; and means for focusing the electrons in said vacuum arc onto said target portion of said anode to generate a short X-ray pulse of high intensity.

References Cited in the file of this patent

UNITED STATES PATENTS

| | | |
|---|---|---|
| 1,738,960 | Mutscheller | Dec. 10, 1929 |
| 1,970,532 | Bouwers | Aug. 14, 1934 |
| 2,311,705 | Slack | Feb. 23, 1943 |
| 2,720,607 | Criscuolo et al. | Oct. 11, 1955 |
| 2,817,002 | Dyke et al. | Dec. 17, 1957 |
| 2,886,725 | Yanagisawa | May 12, 1959 |